Oct. 9, 1962     E. W. ALMQUIST, JR     3,057,222
SHIFTING MECHANISM
Filed Dec. 13, 1961     3 Sheets-Sheet 2
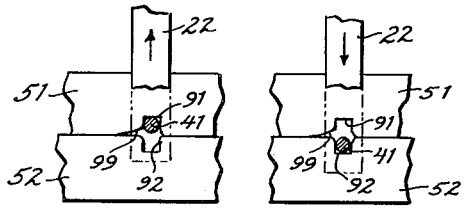
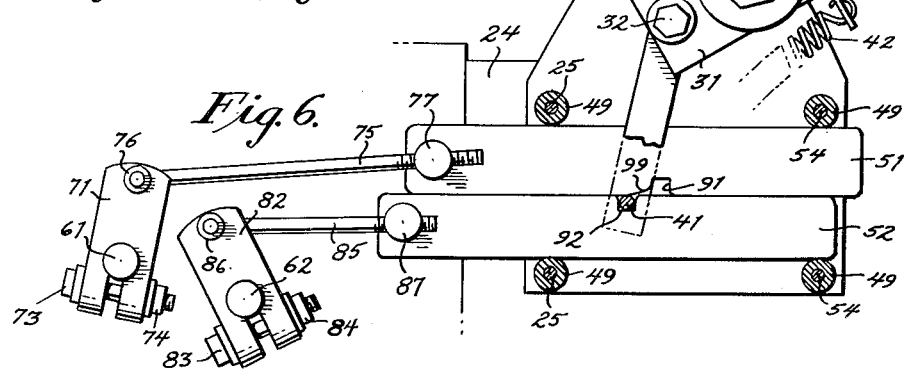
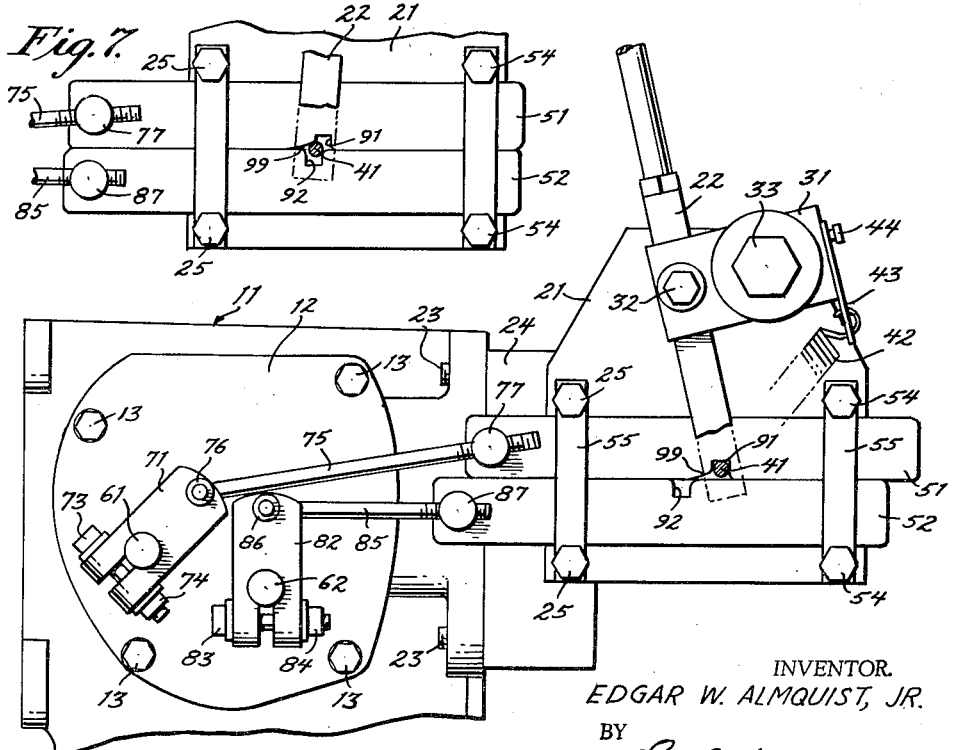
INVENTOR.
EDGAR W. ALMQUIST, JR.
BY
ATTORNEY.

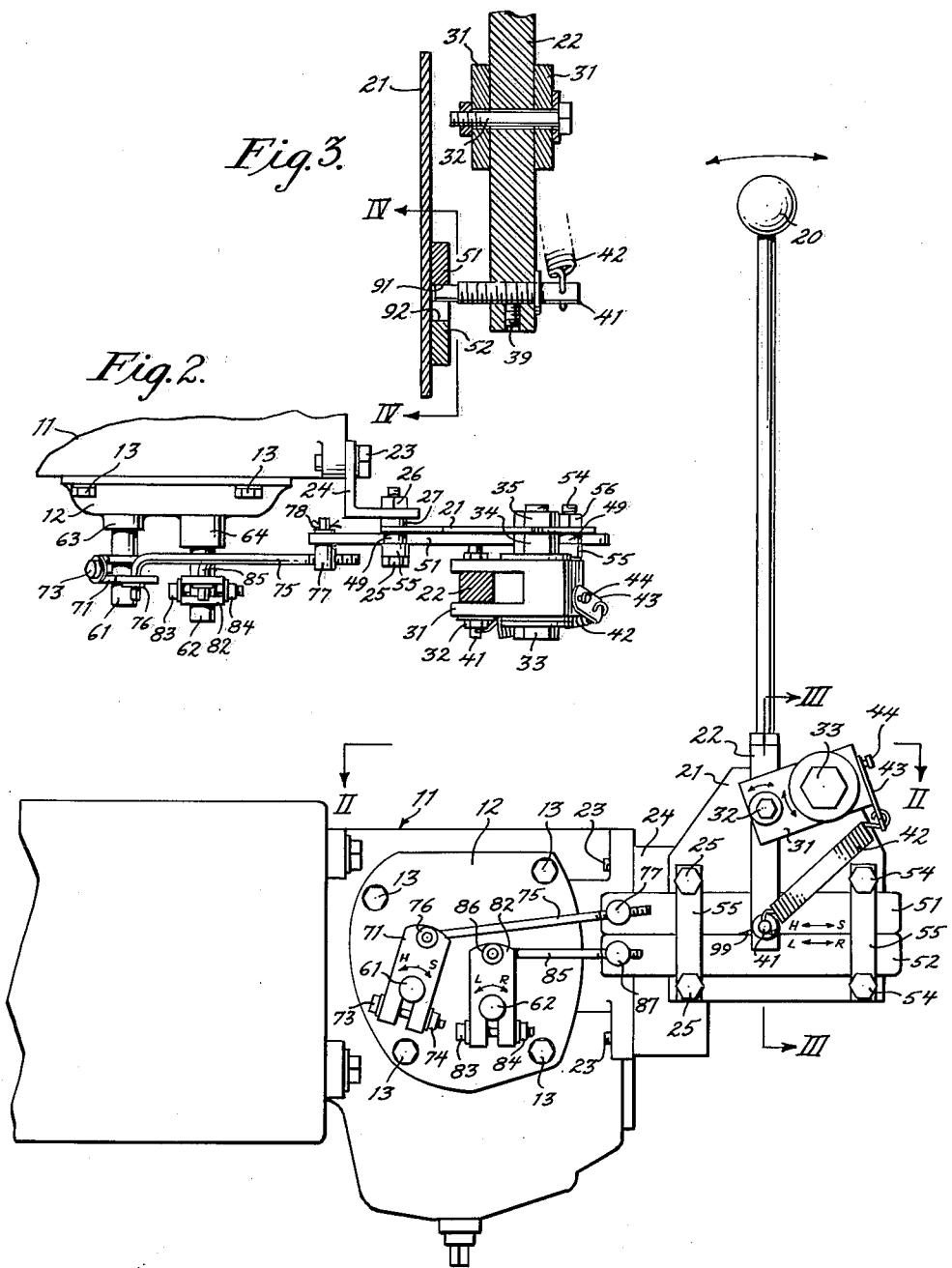

Oct. 9, 1962 E. W. ALMQUIST, JR 3,057,222
SHIFTING MECHANISM
Filed Dec. 13, 1961 3 Sheets-Sheet 3

INVENTOR.
EDGAR W. ALMQUIST, JR.
BY
Charles A. McClure
ATTORNEY.

United States Patent Office 3,057,222
Patented Oct. 9, 1962

3,057,222
SHIFTING MECHANISM
Edgar W. Almquist, Jr., Norman Hills, Milford, Pa.
Filed Dec. 13, 1961, Ser. No. 159,013
9 Claims. (Cl. 74—473)

This invention relates to shifting mechanism for transmissions, such as in automotive vehicles or the like, concerning especially improved interconnection between the customary shift lever and the transmission itself.

Conventional shifting mechanisms for changing from one speed range or gear ratio to another, as is done in operation of standard automotive transmissions, for example, do not permit the shifting to be accomplished as rapidly as might be desired, especially for racing or sports cars. The principal delay occurs in the crossover through which the shift lever passes in going from first or low gear to second or intermediate gear, in the usual American transmission, which has one reverse and three forward speeds; in transmissions with four forward speeds, customary in European cars, a like difficulty is encountered in shifting from second to third gear. Where reverse is in line with one of the forward speeds, as in the transmission with three forward speeds, there also is a risk of engaging reverse when shifting from low to second, with consequent likelihood of damage to the mechanism.

A primary object of the present invention is provision of improved gear-shifting mechanism for automotive transmissions or the like.

An object is provision of novel mechanism interconnecting a gear-shift lever with a transmission in such a manner that the lever need be moved only in a single plane to engage each of four speeds or gear ratios.

Another object is reduction of the time required to shift from one speed or gear ratio to another, especially from low to second gear in a transmission with three forward speeds.

A further object is substantial elimination of the risk of shifting into reverse gear instead of into second upon leaving low gear, where low and reverse are in line with one another.

Other objects of this invention, together with means and methods for attaining the various objects, will be apparent from the following description and the accompanying diagrams of a preferred embodiment of the invention.

FIG. 1 is a side elevation of apparatus constructed according to the present invention, shown in the neutral or disengaged position;

FIG. 2 is a plan, partly in section, of the same apparatus taken at II—II of FIG. 1;

FIG. 3 is a front sectional elevation (somewhat enlarged) looking to the rear, taken at III—III of FIG. 1;

FIG. 4 is a side elevation, partly in section, of a portion of the same apparatus, taken at IV—IV of FIG. 3;

FIG. 5 is a fragmentary side elevation similar to FIG. 4 but with certain elements thereof displaced downwardly though still representing the neutral position;

FIG. 6 is a side elevation, partly in section, of the apparatus of the preceding views, shown in the position corresponding to engagement in low gear;

FIG. 7 is a fragmentary side elevation, partly in section, of the same apparatus, in a position displaced slightly from neutral toward engagement in low gear;

FIG. 8 is a side elevation, partly in section, of the same apparatus, shown in the position corresponding to engagement in second gear;

Figure 9:
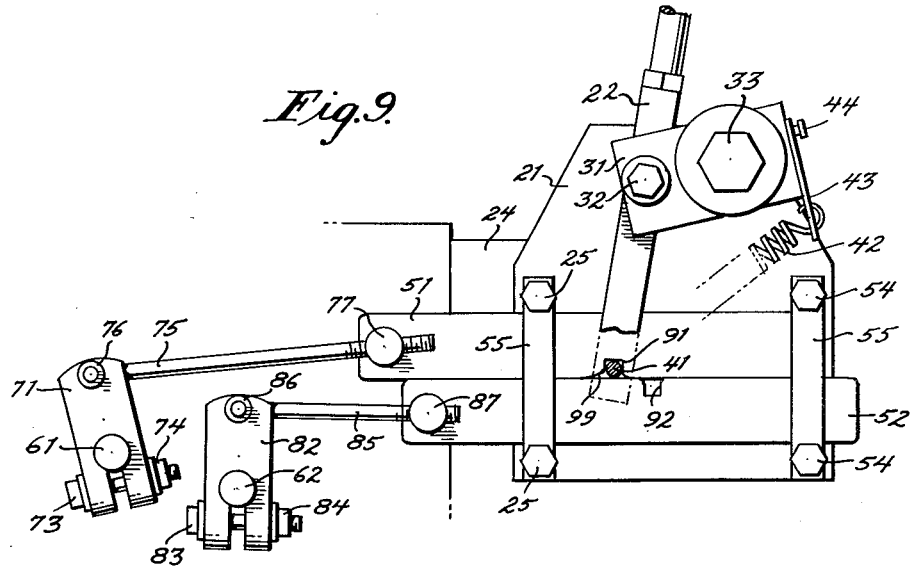
FIG. 9 is a similar side elevation of the same apparatus, shown in the position corresponding to engagement in high gear.

In general, the objects of the present invention are accomplished, in a transmission having two selection members, each movable in opposite directions to extreme engaged positions from a disengaged or neutral position, and having selector means, including a shift lever, for moving either of the selection members to and from each of its engaged positions and from and to the neutral position, by mounting the shift lever for lengthwise, as well as pivoting, movement and providing two selection members, each adapted to be moved separately by pivoting of the shift lever to each of two extreme engaged positions from an intermediate or disengaged position, depending upon the lengthwise positioning of the shift lever.

In particular, the invention contemplates, as mechanism for doing this, mounting means for the shift lever permitting it to pivot about an axis intersecting its longitudinal axis and also permitting it to move essentially parallel to its longitudinal axis, a pair of adjacent recessed members, each adapted to move in opposite directions from an intermediate position, recesses in the respective members being located opposite one another when both recessed members are in the intermediate position, a selector element adapted to engage witfhin the recess in either of the recessed members, the selector element being operatively connected to the shift lever and adapted, upon longitudinal movement of the shift lever, to disengage from and engage in the respective opposite recesses when both recessed members are in the intermediate position, biasing means operatively connected to the shift lever and adapted to bias it in one longitudinal direction, the selector element engaging preferentially in the recess in one of the recessed members in accordance with the biasing of the shift lever in the one longitudinal direction, and connector means interconnecting the first recessed member to one of the two selection members and interconnecting the second recessed member to the other selection member, with the neutral position of the selection members corresponding to the intermediate position of the respective recessed members interconnected thereto.

FIG. 1 shows, in side elevation, and FIG. 2 in plan, transmission housing 11 having side cover plate 12 retained by bolts 13. The gears or other elements inside the transmission housing are or may be wholly conventional, and no showing thereof is included here, not being essential to a complete understanding of this invention. Mounting plate 21 for shift lever 22 and related elements is affixed to the transmission housing by angle bracket 24 attached by bolts 23 to the housing and by bolts 25 to the plate. Each bolt 25 has spacer 27 around it between the plate and the bracket and has nut 26 on its end. the shift lever is supported pivotally in yoke 31 by pin 32, which is movable with the yoke; the body of the yoke is supported pivotally on the mounting plate by fixed pivot pin 33, which is located higher than movable pin 32. Each pivot pin is furnished with a head and an opposite threaded end, which has a retaining nut on it, together with one or more washers—not separately numbered. Pin 33, which is retained by nut 35, carries also spacer nut 34 to provide a constant separation between the adjacent side edges of the plate and the yoke. Arrows near the respective pins in FIG. 1 indicate the directions of pivoting of the parts pivoted thereon, and a similar double-headed arrow in the vicinity of knob 20 on top of the shift lever emphasizes the pivotability of the shift lever about pin 32. Elements in the vicinity of the lower end of the shift lever appear in greater detail in FIG. 3, which shows a portion of the apparatus in front sectional elevation, taken looking toward the right (i.e., to the rear of the apparatus) in FIG. 1, as indicated at III—III.

Affixed to the lower end of the shift lever is selector pin 41, which is threaded transversely through a bore in the shift lever and is retained therein by set screw 39 threaded against it by way of a longitudinal bore in the bottom of the lever. Extension spring 42 biases the selector pin toward backing plate 43, which is retained by screw 44 on the rear face of yoke 31, the opposite ends of the spring hooking through apertures in one end of the selector pin and in the backing plate. Immediately above and below the smooth opposite end of the selector pin are rails or slides 51 and 52, respectively, which are retained slidably between mounting plate 21 on one side and a pair of straps 55 on the other side. The left or forward strap is fastened to the mounting plate by bolts 25, retained by nuts 26, which also fasten angle bracket 24, and the right or rear strap is fastened to the mounting plate by similar (somewhat shorter) bolts 54 and nuts 56.

Each of the slides has connected to it selection mechanism to transform the reciprocating motion of the slide (indicated by the straight double-headed arrows superimposed on the respective slides) to a rotary motion for making the necessary gear changes inside the transmission housing. The arrow associated with upper slide 51 has reference characters H at the left and S at the right to indicate that forward movement (i.e., to the left in this view) of that slide corresponds to engagement of the gear ratio or speed range usually denoted as "high," and that opposite or rearward movement of the upper slide corresponds to engagement in that known as "second." Similarly, the arrow associated with lower slide 52 has reference character L at the left and R at the right to indicate that forward movement of that slide corresponds to engagement in the gear ratio or speed range called "low," and that rearward movement of that slide corresponds to engagement in the "reverse" gear or speed. It will be apparent that movement of either slide in a particular direction, either forward or rearward, corresponds to movement of the upper part of the shift lever in the opposite direction, inasmuch as movement of the slides by the selector pin at the lower end of the shift lever is accomplished by pivoting the lever about pin 32.

Shafts 61 and 62, which enter the housing through bored bosses 63 and 64, respectively (visible in FIG. 2), are adapted to rotate back and forth through a minor part of a circle, upon reciprocating movement of the slides, to change the gear ratios or speeds. Letters and arcuate double-headed arrows near these shafts in FIG. 1 indicate, in like manner as do the arrows and letters along the slides, the gear ratios or speeds engaged upon movement of the shafts as indicated. Thus, rotation of shaft 61 in a counter-clockwise direction engages high (H) gear, and in a clockwise direction engages second (S) gear; while similar counter-clockwise rotation of shaft 62 engages low (L) gear, and clockwise rotation reverse (R) gear.

The selection mechanism interconnecting the reciprocating slides and the pivotable shafts appears in FIG. 1 and partially in FIG. 2. Clamp 71, affixed to shaft 61 by bolt and nut 73 and 74, is bored to receive the angled end of rod 75, which is retained pivotally therein by circlip 76. The other end of the rod is threaded into pivot pin 77, which extends transversely through a bore in the end of shaft 61 and is retained pivotally therein by cotter pin 78. Clamp 82, affixed to shaft 62 by bolt and nut 83 and 84, receives in like manner rod 85 retained by similar clip 86, and the other end of the rod is threaded into pivot pin 87, also retained by a cotter pin.

FIGS. 4 and 5 show, in side elevation, partly section, alternative locations of selector pin 41 with regard to slides 51 and 52 while in the neutral position. Recess 91 in the lower face of upper slide 51 and recess 92 in the upper face of lower slide 52 are juxtaposed in neutral, as shown. Each recess is large enough for the selector pin to rest entirely therein. Whereas recess 92 is essentially square and straight-sided (i.e., with its forward and rearward edges substantially perpendicular to the adjacent or upper face of slide 52) in the illustrated transverse view, recess 91 (otherwise similar) has its forward edge, which is to the left in these views, rounded to provide sloping ramp 99, the importance of which will appear later. The ramped forward edge of recess 91 flares outward from substantial perpendicularity to the adjacent or lower face of slide 51 to intersection of that face at an acute angle, which may approach zero, whereas the entire rearward edge is substantially perpendicular. Ordinarily, as shown in FIG. 4, the upward bias (indicated by the arrow along shift lever 22) imposed by spring 42 (not visible in these fragmentary views) forces the selector pin into recess 91. However, FIG. 5 shows that when the shift lever is pressed downward (as indicated by the arrow) the selector pin leaves recess 91 in the upper slide and enters recess 92 in the lower slide. In either location of the selector pin the slides can be moved relative to one another so as to retain the pin in engagement with the slide whose recess it occupies. The slight displacement corresponding to the interchange or crossover of the selector pin between the recesses of the respective slides is accommodated by pivoting of yoke 31 about pin 33 (see FIGS. 1 and 2), resulting in an essentially lengthwise movement of the shift lever. Pin 32, about which the lever pivots in a substantial arc during shifting, being supported on the yoke, moves with the lever during such lengthwise or longitudinal movement.

FIG. 6 shows, in side elevation (partly in section), the apparatus shown in FIG. 1 except that the transmission housing is largely omitted as superfluous. The lower part of shift lever 22 is cut away to show selector pin 41 in section. Also, pairs of bolts 25 and 54, which retain straps 55 (previously shown) and which immediately overlie and underlie pair of slides 51 and 52, are sectioned in this view to show bushings 49, which surround them between the straps and the mounting plate to space the straps therefrom by a distance at least as great as the width of the slides and to guide and facilitate reciprocation of the slides. Whereas in this view upper slide 51 and its connected gear-selection mechanism are unchanged in position from the neutral position shown in FIG. 1, shift lever 22 is tipped rearward at the top, with selector pin in recess 92 of lower slide 52, thereby forcing that slide forward and rotating shaft 62 counterclockwise. Thus, FIG. 6 corresponds to engagement of the low gear ratio or speed of the transmission.

It will be apparent that, as shown in FIG. 7, which shows the selector pin and slides displaced from neutral only slightly, in the direction of low gear (i.e., in between the respective positions shown in FIG. 1 and FIG. 6 but nearer the former), ramp 99 at the forward edge of recess 91 in upper slide 51, which the selector pin leaves in order to engage recess 92 in lower slide 52, assists the operator by reducing the extent of downward (or lengthwise) movement that he must impart to the shift lever in shifting from neutral to low; an accompanying requirement of such shifting is, of course, rearward movement of the upper part of the shift lever.

Shifting from low to second gear is accomplished by moving the top end of the shift lever forward, pivoting it about pin 32, to the second gear position (S), which is shown in FIG. 8. It will be apparent that when lower slide 52, which is sliding rearward as the shift lever is so moved, approaches neutral position, the upward bias on the selector pin will cause the pin to move upward along ramp 99 at the forward edge of recess 91, and by the time the recesses in the respective slides are fully juxtaposed (i.e., in neutral position) the selector pin will be engaged entirely in that recess of upper slide 51. Accordingly, continued forward pivoting of the shift lever will move that slide to the rear and, through the interconnecting mechanism, will pivot shaft 61 clockwise to engage second gear. The gradual crossover of the selector pin provided by the ramp ensures against accidental retention of the pin in recess 92 (as might occur because of some downward force exerted on the shift lever in pushing it forward), which would result in rearward movement of lower slide 52 (rather than the upper slide), bringing about engagement of reverse gear and consequent damage to the transmission. It will be apparent also from FIG. 8 that spring 42, which biases the selector pin upward, also biases the lower end of the shift lever rearward, thereby further facilitating the shifting from low to second gears, which is the step in which most delay is encountered in conventional shifting mechanisms. In addition, because of the downward slope of yoke 31 from fixed pivot pin 33 forwardly to movable pivot pin 32, which directly supports the shift lever, forward movement of the upper part of the shift lever itself tends to raise the shift lever and the attached selector pin, providing a further safety factor against inadvertent engagement of reverse and speeding the crossover from low to second.

FIG. 9 shows, largely in side elevation, the same apparatus with the shift lever in nearly the same position as shown in FIG. 6. However, whereas FIG. 6 showed the low gear position (L), FIG. 9 shows the high gear position (H), in which the shift lever is slightly higher, corresponding to engagement of the selector pin in recess 91 of upper slide 51 instead of in recess 92 of lower slide 52. It will be apparent that, as the shift lever moves rearward from engagement of second gear toward engagement of high gear, slide 51 remains continuously engaged in the selector pin and slides from its extreme rearward to its extreme forward position.

Figure 10:
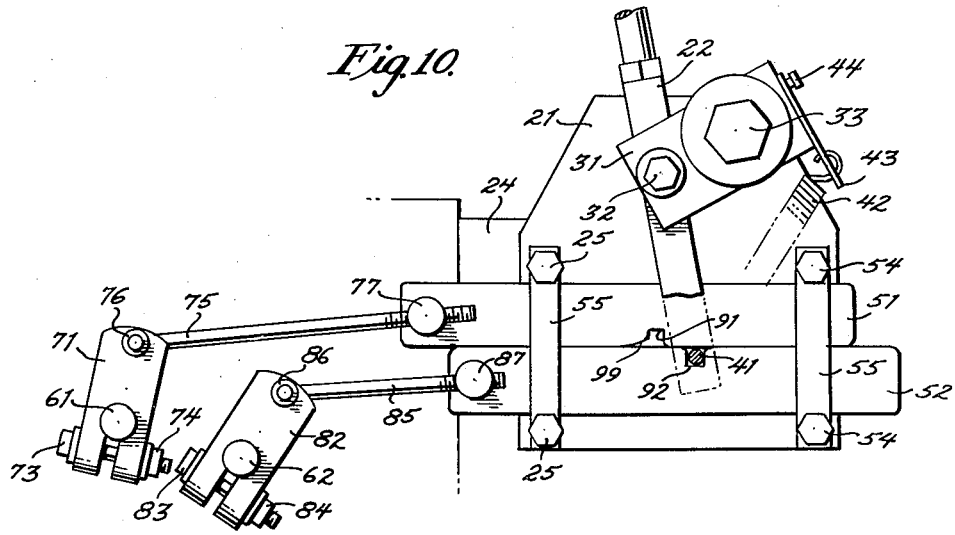
FIG. 10 is a similar side elevation of the same apparatus, shown in the position corresponding to engagement in reverse gear.

FIG. 10 shows, largely in side elevation, the same apparatus in the position corresponding to engagement of reverse gear. This view differs from that of FIG. 8, which represents the second gear position (S), in the engagement of the selector pin in recess 92 of lower slide 52, instead of in recess 91 of upper slide 51. It will be apparent that because of the square rear edge of recess 92 the operator must depress the shift lever very definitely and must simultaneously move the upper part of it forward in order to rotate shaft 62 to the reverse gear position (R) shown here.

Accordingly, it is apparent that, according to this invention, the shift lever moves in only a single plane when shifting gears regardless of the gear ratios or speeds employed. While manual depression of the shift lever is required to engage low gear, this is facilitated by the ramp presented to the selector pin. That ramp and the biasing spring together facilitate the shifting from low to second gear. Such shifting is speedy and accurate. Shifting to high gear from second is unhindered. In effect, a straight-line movement (between the rearward and forward positions of the shift lever and back again) replaces the conventional left, right, back, forth, and across movement of the shift lever in conventional gear-shifting mechanism. Also, in the apparatus of this invention, reverse gear is normally avoided but is readily available when required. The full benefits and advantages of this invention will become most apparent to those undertaking to practice it.

While the specific embodiment of this invention here shown and described is preferred at present, it undoubtedly may be modified without departing from the inventive concept. For example, parts may be combined or divided while retaining the essentials of function and structure utilized according to the invention. Furthermore, the tension of the biasing spring may be varied, as by providing retaining means therefor at various distances from the selector pin or by interchanging springs of various tensile characteristics. At high spring tensions the shifting from low to second may be made essentially automatic, requiring only that the operator permit the shift lever to move forwardly as required. Also, rotatable sleeves or the like may be provided immediately overlying and underlying the pair of slides, perhaps in addition to or in place of the bushings shown there, to facilitate reciprocation of the slides. These suggested changes are only exemplary. The resulting structures and any equivalent structure are intended to be covered by the invention, as defined below.

The claimed invention:

1. Transmission gear-shifting mechanism having a shift lever movable in only a single plane and comprising mounting means having a fixed pivot pin, a movable pivot pin intersecting the longitudinal axis of the shift lever and pivotally supporting the shift lever, means pivotally supported by the fixed pivot pin and pivotally supporting the movable pivot pin, a selector pin carried by the shift lever near one end thereof, a plurality of selection means independently actuatable by the shift lever and including a pair of recessed members separately engageable by the selector pin upon essentially longitudinal movement of the shift lever about the fixed pivot means and separately movable by the selector pin when so engaged upon pivoting of the shift lever about the movable pivot means.

2. The apparatus of claim 1 wherein each of the recessed members is movable from an intermediate position to two extreme positions, location of both recessed members in the intermediate position corresponding to a neutral position of the gear lever, and wherein either of the recessed members is movable to one of its extreme positions by a pivoting of the shift lever in one direction about the pivot intersecting its axis and to the opposite extreme position by pivoting of the shift lever in the opposite direction about that pivot.

3. The apparatus of claim 2 wherein the selector pin is disengageable from and engageable in the respective recessed members only in the intermediate or neutral position and wherein the movable pivot pin is located forwardly of and at a lower level than the fixed pivot pin, whereby pivoting movement of the shift lever to move the selector pin rearward exerts an upward force thereon, and the respective recessed members are so located that upward force on the selector pin while the shift lever is so moving one of the recessed members from the extreme forward to the intermediate position is effective when that recessed member reaches the intermediate position already occupied by the other recessed member to disengage the selector pin from the one recessed member and engage it is in the other, continued like movement of the shift lever being effective to move the other recessed member so engaged to the extreme rearward position.

4. The apparatus of claim 2 wherein the selector pin is disengageable from and engageable in the respective recessed members only in the intermediate or neutral position and including biasing means interconnected to the selector pin and effective to urge the pin preferentially into engagement with a certain one of the recessed members in that position and to urge the selector pin and the engaged recessed member toward a certain one of the extreme positions.

5. The apparatus of claim 4 wherein the extreme position toward which the biasing means urges the preferentially engaged recessed member corresponds to an intermediate gear ratio or speed range and the opposite extreme position of that recessed member corresponds to a higher gear ratio or speed range, while the extreme engaged position of the other recessed member toward which biasing means urges that other member when engaged by the selector pin corresponds to a reverse gear ratio or speed range, and the opposite extreme position of that other recessed member corresponds to a low gear ratio or speed range in the forward, as distinguished from the reverse, direction, and the edge of the first recessed member engaged by the selector pin in disengaging from the other recessed member in shifting from the low to the intermediate gear ratio or speed range is flared to facilitate disengagement of the selector pin from the other recessed member and engagement with the first recessed member.

6. A shifting mechanism for actuating mechanism for selecting gear ratios or speed ranges of a transmission wherein there are at least three engaged positions to be occupied in sequence and only two selection members therefor, each selection member having two extreme positions corresponding to selected gear ratios or speed ranges, comprising a pair of slides juxtaposed to and reciprocable forwardly and rearwardly along one another to their respective extreme positions, each slide having a recess in the face thereof adjacent the recessed face of the other slide, the recesses being juxtaposed to one another when the slides are in an intermediate position, a selector pin reciprocable forwardly and rearwardly and reciprocable also perpendicularly to the adjacent recessed faces of the slides and adapted to engage the recesses in the respective slides and thereby move them separately to and from each extreme position, successive selection of two of the three positions to be occupied in sequence requiring a single forward to rearward movement of the selector pin and also a single perpendicular movement thereof, whereby the selector pin must be disengaged from the recess in one slide and be engaged in the recess in the other slide in proceeding in the proper order from one to the other of those two of the sequential positions.

7. The apparatus of claim 6 wherein the forward edge of the recess in the slide engaged by the selector pin in the second of the two positions is flared, while the rearward edge of that recess and the forward and rearward edges of the recess in the slide engaged by the selector pin in the first of the two positions are substantially perpendicular to the adjacent recessed faces thereof, whereby disengagement of the selector pin from the one recess and engagement of the other recess thereby in passing from the first to the second of the two sequential positions is facilitated.

8. The apparatus of claim 6 including a biasing spring connected to the selector pin and urging it obliquely, both rearwardly and toward the slide engaged by the selector pin in the second of the two sequential positions, whereby disengagement of the selector pin from the one recess and engagement of the other recess thereby in passing from the first to the second of the two sequential positions is facilitated, as is rearward movement of the slide containing the latter recess, the extreme rearward position thereof corresponding to the second of the two sequential positions.

9. In a transmission having two selection members, each movable in opposite directions to extreme engaged positions from a disengaged or neutral position, and having selector means, including a shift lever, for moving either of the selection members to and from each of its engaged positions, from and to the neutral position, the improvement comprising mounting means for the shift lever permitting it to pivot about an axis intersecting its longitudinal axis and also permitting it to move essentially parallel to its longitudinal axis, a pair of adjacent recessed members in the form of a pair of slides juxtaposed to and reciprocable forwardly and rearwardly along one another, each adapted to move in opposite directions from an intermediate position, adjoining portions of the respective recessed members each having a recess therein, the respective recesses being located opposite one another when both recessed members are in the intermediate position, the recess in one of the recessed members having both its forward and rearward edges substantially perpendicular to the adjoining face of the slide, and the recess in the other recessed member having one of its corresponding edges substantially perpendicular to the adjoining face of the slide and having its other corresponding edge flaring outward from substantial perpendicularity near the base of the recess to acute intersection with that face, a selector element adapted to engage within the recess in either of the recessed members, the selector element being operatively connected to the shift lever and adapted, upon longitudinal movement of the shift lever, to disengage from and engage in the respective opposite recesses when both recessed members are in the intermediate position, biasing means operatively connected to the shift lever and adapted to bias it in one longitudinal direction, the selector element engaging preferentially in the recess in one of the recessed members in accordance with the biasing of the shift lever in one longitudinal direction, and connector means interconnecting the first recessed member to one of the two selection members and interconnecting the second recessed member to the other selection member, with the neutral position of the selection members corresponding to the intermediate position of the respective recessed members interconnected thereto.

References Cited in the file of this patent

UNITED STATES PATENTS

| | | |
|---|---|---|
| 2,274,539 | Fishburn | Feb. 24, 1942 |
| 2,284,191 | Fishburn | May 26, 1942 |
| 2,924,988 | Primean | Feb. 16, 1960 |
| 2,961,890 | Marshall | Nov. 29, 1960 |
| 3,018,670 | Lohn | Jan. 30, 1962 |

UNITED STATES PATENT OFFICE

CERTIFICATE OF CORRECTION

Patent No. 3,057,222                      October 9, 1962

Edgar W. Almquist, Jr.

It is hereby certified that error appears in the above numbered patent requiring correction and that the said Letters Patent should read as corrected below.

Column 2, line 26, for "witfhin" read -- within --; line 55, for "the" read -- The --; column 3, line 15, strike out "a"; lines 26 and 33, for "wtih", each occurrence, read -- with --; line 71, after "partly" insert -- in --; column 6, line 26, for "gear" read -- shift --; line 46, strike out -- is --.

Signed and sealed this 26th day of March 1963.

(SEAL)
Attest:

ESTON G. JOHNSON                      DAVID L. LADD

Attesting Officer                      Commissioner of Patents

Notice of Adverse Decision in Interference

In Interference No. 93,725 involving Patent No. 3,057,222, E. W. Almquist, Jr., SHIFTING MECHANISM, final judgment adverse to the patentee was rendered Jan. 21, 1965, as to claim 6.

[*Official Gazette May 18, 1965.*]